United States Patent [19]
Sugihara

[11] 4,422,114
[45] Dec. 20, 1983

[54] CASSETTE TAPE PLAYER

[75] Inventor: Masanori Sugihara, Kawagoe, Japan

[73] Assignee: Pioneer Electronic Corporation, Tokyo, Japan

[21] Appl. No.: 274,149

[22] Filed: Jun. 16, 1981

[30] Foreign Application Priority Data

Jun. 20, 1980 [JP] Japan ............................. 55-82772
Jun. 20, 1980 [JP] Japan ............................. 55-82773
Jun. 20, 1980 [JP] Japan ............................. 55-82775

[51] Int. Cl.³ .................. G11B 15/26; G11B 15/48
[52] U.S. Cl. ................... 360/96.4; 242/208; 360/90; 360/96.3; 360/74.1
[58] Field of Search ............ 360/96.4, 96.3, 73, 360/90, 74.1–74.7; 242/197–205, 207–208

[56] References Cited
U.S. PATENT DOCUMENTS 3,550,984 12/1970 Moore ..................... 360/90
4,069,506 1/1978 Uenu ...................... 360/96.5
4,101,941 7/1978 Tanaka .................... 360/96.4
4,227,223 10/1980 Magata ................... 360/96.3
4,291,348 9/1981 Pera ...................... 360/96.2

Primary Examiner—Alfred H. Eddleman
Attorney, Agent, or Firm—Brumbaugh, Graves, Donohue & Raymond

[57] ABSTRACT

A tape player for recording and reproducing sound. It is characterized in that it includes a first motor adapted to drive both a take-up reel and a capstan and a second motor which is selectively operated to drive said take-up or feed reel at high speed for fast forwarding or fast rewinding of the tape. Said selective operation is performed by gearing means including a second motor pulley, a sun gear, a second drive belt passed around the second motor pulley and the sun gear, a planet gear in mesh with the sun gear and a rocker arm to swing the planet gear between the feed and take-up reels. There is also provided a tape player having a group of feather touch type push buttons for recording, reproduction, fast forward and rewinding and switching off whereas only cassette ejecting operations are performed by mechanical means.

8 Claims, 14 Drawing Figures

CASSETTE TAPE PLAYER

BACKGROUND OF THE INVENTION

The present invention relates in general to tape players, and more particularly to the dual motor system of a tape player for driving the reels and the capstan.

In the prior art, tape players of the type which incorporate a dual motor system for driving the reels have been well known. In these tape players two motors are operatively linked to the tape-up and feed reels and the capstan; the one for driving the take-up and feed reels and the other the capstan. In fact, recordings or reproductions normally take long time periods. Therefore, since in the prior art tape player the both motors have had to be powered at the same time recording or reproduction have been very much wasteful of electricity. Furthermore, in order to provide particularly a good recording, the both motors should create no objectionable noise, which demands the use of expensive, high-quality motors.

SUMMARY OF THE INVENTION

The present invention is directed to an improved tape player of the dual motor type free from the above problems in which the one motor drives both the take-up reel and the capstan for recording or reproducing the sound whereas the other functions only for the fast forwarding and fast rewinding of the tape. Therefore, the primary object of the present invention is to provide a tape player which needs not power the two motors at the same time for recording or reproducing and hence is economical in electricity consumption. Another object of the present invention is to provide an efficient tape player which is less expensive compared with the prior art, since the same operational efficiency is not required for the two motors; one of them is only employed for fastspeed driving of the reels and hence need not be of the high quality type.

BRIEF DESCRIPTION OF THE DRAWINGS

With respect to the accompanying drawings, the preferred embodiments of the present invention will hereinafter be described in greater detail in which.

DETAILED DESCRIPTION OF THE EMBODIMENTS

Figure 1:
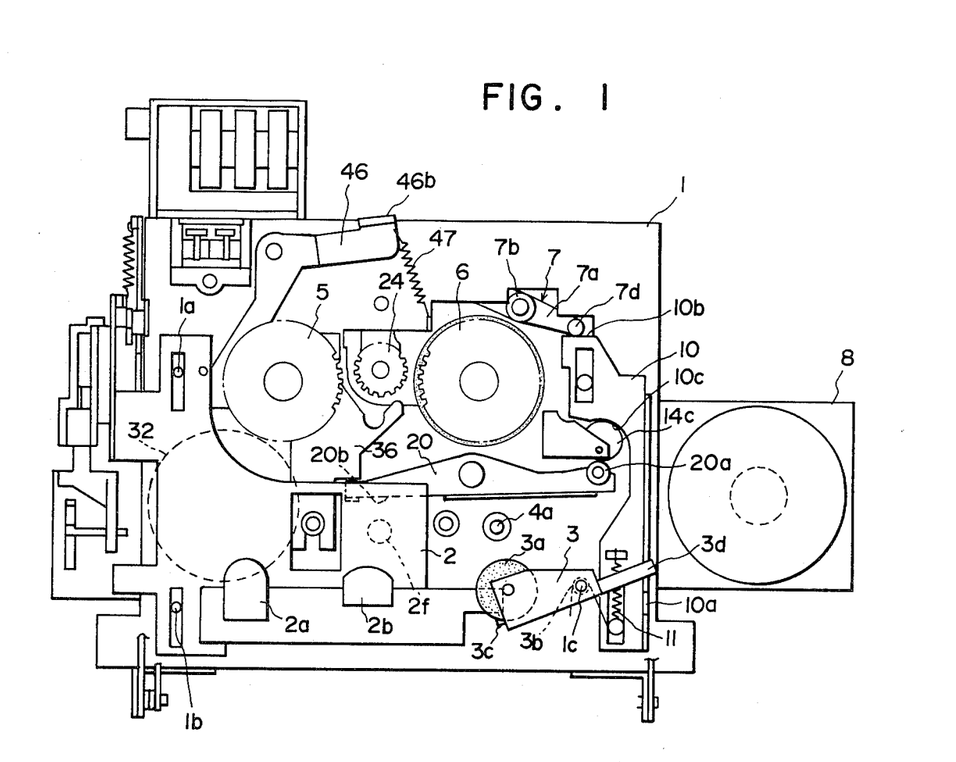
FIG. 1 is a plan view of one embodiment of the tape player according to the present invention.

Referring to the attached drawings, the reference numeral 1 indicates generally a chassis of a tape player (of the cassette type) constructed in accordance with the present invention which comprises a head base 2 that is slidably disposed thereon and urged upward in FIG. 1 by some suitable tension spring means (not shown) provided between the chassis and the head base for advancing an erase head 2a or a recording and reproducing head 2b mounted on the head base against the tape face. A pair of guide pins 1a and 1b are secured to the chassis 1 to project through a corresponding pair of bores in the head base for guiding the back-and-forth movement of the head base. A pinch roller holder generally designated at 3 is pivotally mounted on a support pin 1c secured to the chassis 1 and carries a pinch roller 3a at its one end. A torsion spring 3b is fixed around the support pin in such a manner that the pinch roller 3a is normally urged to rotate clockwise toward a capstan 4a which will be described later in full detail. The pinch roller holder 3 is also provided with an engaging flap 3c adapted to bear against a rear end of the head base 2. Furthermore, an actuating arm 3d extends from the other end of the pinch roller holder to abut against a forward end of a stop 10a formed in a setting plate 10 the operation of which will be explained later in this specification. A flywheel 4 is rotatively mounted on the same axis on which the capstan 4a is carried.

A feed reel 5 and a take-up reel 6 are both rotatively mounted on their respective shafts secured to the chassis 1, respectively. A reel actuating unit largely indicated at 7 comprises a swiveling lever 7a and a reel actuating pulley 7b. The swiveling lever 7a is rotatively disposed on a pivot pin secured to the chassis 1 and centrally provided with a pin upon which the pulley 7b is rotatively carried in a manner such that its periphery is able to contact with the circumference of a rubber roller on the take-up reel 6 for rotation of the reel through the rubber roller. An arresting projection 7d is formed on one end of the swivelling lever 7a to bear against a forward edge 10b of the setting plate 10. Furthermore, a tension spring 7e, fixed at its one end to the chassis 1, is connected to the swiveling lever 7a at the other end to urge the latter to rotate in a clockwise direction. In the chassis is provided a first motor 8 that is operatively connected to a motor pulley 8a to drive the latter which is connected to the reel actuating pulley 7b and the flywheel 4 for rotation thereof by means of a drive belt 9 that is passed around the peripheries of the motor pulley, reel actuating pulley and the flywheel. The setting plate 10 is slidably disposed on the chassis 1 and is urged in the rearward direction by the action of a tension spring 11.

A first gear wheel 12 is rotatively journal-mounted on a shaft fixed to the chassis 1 and formed with a cavity 12a of partially deformed eccentric configuration in its underside. Within the eccentric cavity 12a is centrally disposed a cam 12b and an engaging projection 12c extending downward. In the underside of the first gear wheel an area comprises the least distance between the outer circumference of the cam 12b, and the rim of the eccentric cavity 12a is here termed the narrowist spaced path 12al. For purposes which will be described later, it should be arranged such that the engaging projection 12c and the radially middle point in the narrowest spaced path are located substantially equal in the distance from the center of the gear wheel. A second gear wheel 13 is also rotatively mounted on a shaft 13a for rotation in mesh with the first gear wheel. On this shaft is mounted a second gear pulley (not shown) for rotation of the second gear wheel in synchronism and belt-driven by a flywheel pulley (not shown) coaxially mounted on the shaft carrying the flywheel 4 and driven by the latter in synchronism. Thus, when the first motor 8 is energized to rotate the flywheel 4 which in turn drives the first gear wheel 12 through the second gear wheel 13. A third gear wheel 14 is journal-mounted on a shaft secured to the chassis 1 and rotated in mesh with the second gear wheel 13 and has two notched portions 14a on its toothed periphery where the third gear wheel does not mesh with the second gear wheel 13. On the upper surface of the third gear wheel 14 is mounted a 180 degree ratchet which has only two teeth 14b. Further, a cam plate 14c is mounted on said ratchet. Those members may preferably be a single integrally molded member. A locking arm 15 is pivotably mounted on the chassis to thrust its longer finger against one of the teeth 14 to preclude rotation of the latter. The locking arm has a shorter finger so designed to be magnetically attracted for a short period of time by a solenoid 16 when the latter is energized. Upon being magnetically attracted by the solenoid the locking arm is therefore rotated clockwise thereby instantaneously unlocking its longer arm from the tooth 14b.

An automatic stopper lever 17 which is pivotally connected to a stopper lever is rotatively disposed on the chasis in such a manner as will be explained later. The automatic stopper lever is provided with an engaging projection 7a in a middle portion of its bottom surface to extend downward to engage with a scissorlike arm 18. A control projection 17b extends upward from the upper surface of the automatic stopper lever into the eccentric cavity 12a of the first gear 12. The scissorlike arm 18 is rotatively mounted on the same shaft 6a on which the take-up reel 6 is mounted in a manner such that the scissorlike arm will be biased toward the same direction in which the reel is rotated. But when the take-up reel is not rotated the scissorlike arm is left to swing freely.

Therefore, when the take-up reel 6 is rotated in the counter-clockwise direction (the arrowed direction in the drawing) the scissorlike arm 18 is then made to swing in the arrowed direction. This rotational action in turn acts to rotate the automatic stopper lever 17 also in the counter clockwise direction through the engaging projection 17a thereby pulling at the control projection 17b into engagement with the rim of the eccentric cavity 12a of the first gear 12. When the take-up reel 6 rewinds the tape rotating in the clockwise direction (the direction opposite to the arrow in the drawing), the scissorlike arm 18 will be swung back clockwise. This causes the automatic stopper lever 17 to rotate clockwise thereby pushing the control projection 17b into abutment against the extenral periphery of the cam plate 12b. When the rotation of the take-up reel 6 is put to a rest, the scissorlike arm 18 becomes free to rotate, thereby putting the automatic stopper lever 17 into its neutral position with its control projection in contact neither with cam plate or with eccentric cavity of the first gear. In this case, the first gear 12 till rotates to force the control projection 17b to pass through the narrowest spaced path 12al so that the control projection will be positioned to a predetermined point along its swing track where the engaging projection 12c, while rotating, is to intersect. Thus, when the engaging projection is further rotated to engage with the control projection so as to swing the latter clockwise, the automatic stopper lever 17 is moved forward, pulling forward the stopper lever 19 by means of a connecting pin 19a. This actuates the automatic stop mechanism to turn off the tape player in a manner as will be explained later in greater detail. Thereafter, the control projection will be disengaged from the engaging projection.

A play arm 20 is mounted on the chassis adjacent to the head base and has at one end a play arm roller 20a for rotation in contact with a cam plate 14c that is mounted on the third gear wheel 14. A tension spring 20b connects the other end of the play arm 20 with the head base 2 and thus normally urges the play arm 20 to swing in a counter-clockwise direction, forcing the play arm roller 20a into contact with the cam plate 14c.

Figure 2:
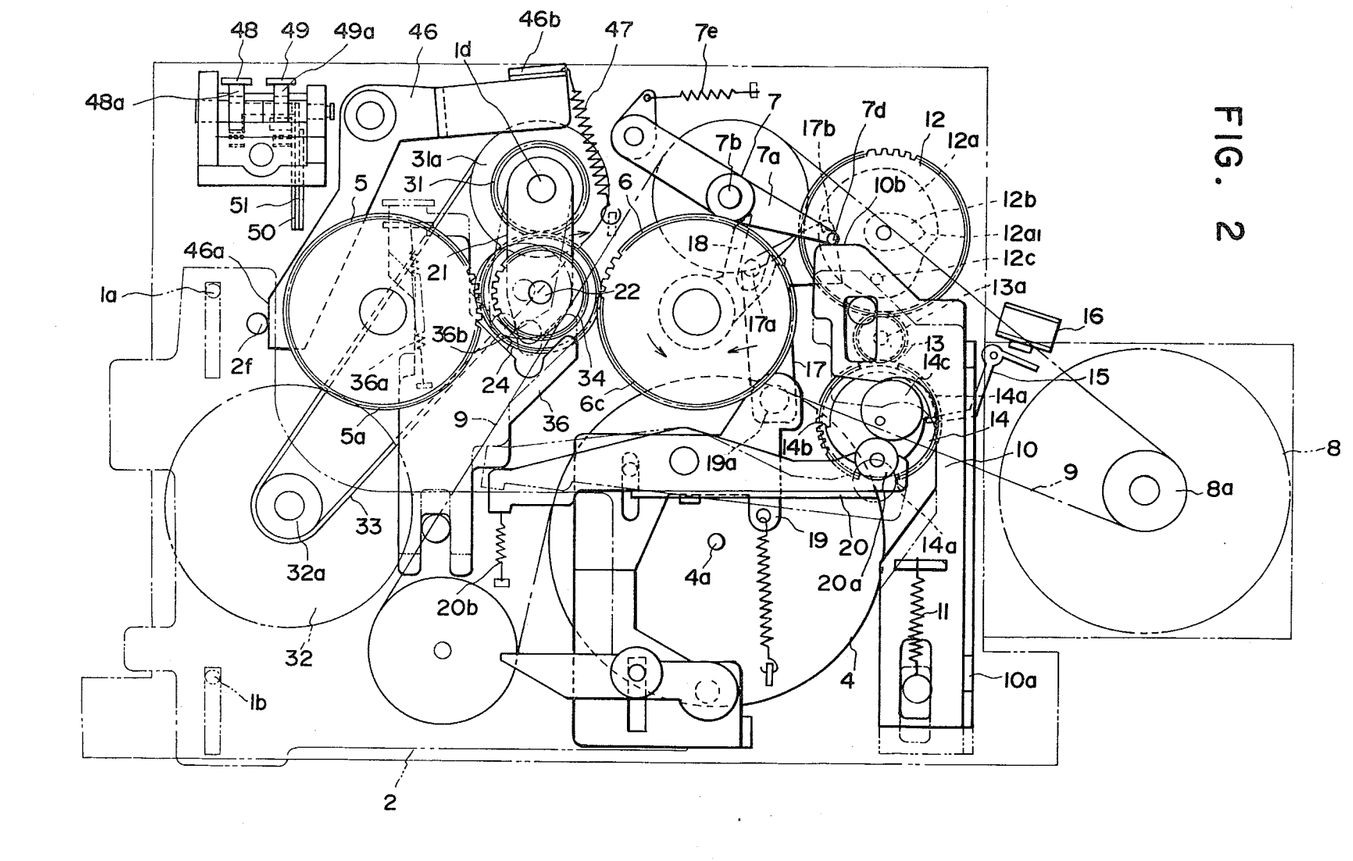
FIG. 2 is a plan view of the tape player with its chassis being removed therefrom.
Figure 3:
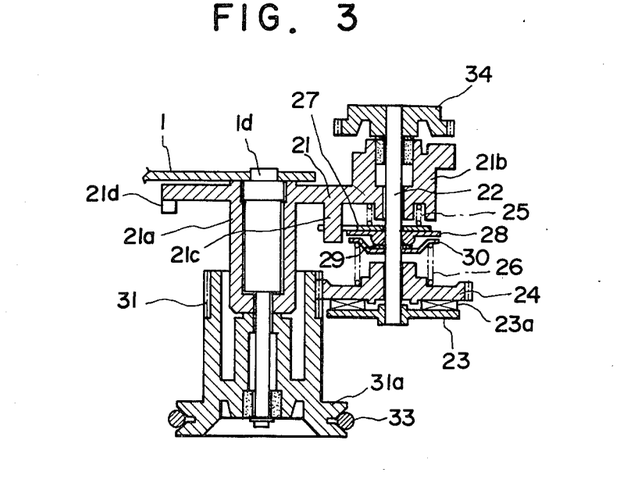
FIG. 3 is a sectional view of fast forward or rewinding mechanism of the tape player shown in FIGS. 1 and 2.

A rocker arm 21 is pivotally mounted at its rear portion 21a on a support pin 1d fixed to the chassis 1. The rocker arm 21 terminates at its forward end in a shaft supporting platfortm 21b through which a swiveling shaft 22 is rotatively journalled. The lower end of the swiveling shaft 22 is coaxially connected to a disc 23 for rotation therewith. Preferably, the upper surface of the disc is fitted with frictional felt linings 23a. A planet gear 24 is also carried on the swiveling shaft 22 for rotation. A pair of compression springs 25 and 26 are interposed one upon another between the underside of the shaft supporting platform 21b of the rocker arm 21 and the planet gear 24. Between the two compression springs 25 and 26 are sandwiched a forked washer 27, a first bush 28, a washer 29, and a second bush 30 that are overlapped one upon another in the order from top to bottom of their name appearing as above; the forked washer on top, the first bush the next and so on. The compression spring 26 serves to press the planet gear 24 against the upper surface of the disc 23 of the rocker arm 21 with the frictional felt linings 23a interposed therebetween. The rocker arm 21 is also provided at an intermediate point in its length in the underside with a swiveling projection 21c that extends downward to be entrapped between the fork of the forked washer 27. A sun gear 31 is rotatively carried on the support pin 1d. It is so arranged that the rocker arm 21 swings back and forth as the planetary gear 24 rotates in mesh with the sun gear 21. Furthermore, the sun gear 31 is connected at its lower end to a sun gear pulley 31a to be rotated by the latter. The sun gear pulley is driven by means of a drive belt 33 from a second motor pulley 32a operatively connected to a second motor 32. Therefore, as the second motor is powered to drive the second motor pulley, the pulley 31a is driven through the drive belt to rotate the sun gear 31, which in turn drives the disc 23 through the planet gear 24. Furthermore, the rotation of the disc is transmitted through the swiveling shaft 22 to a swiveling gear 34 that is attached to the upper end of the swiveling shaft 22. Of the members interposed between the compression springs 25 and 26 the first bush 28 is secured to the swiveling shaft 22 for rotation thereby and pressed against the forked washer 27 by the force of the compression spring 25. Therfore, when the swiveling shaft 22 is rotated in one direction, the forked washer 27 will fling its forked end in the same direction with the swiveling projection 21c engaged therewith. This swing motion causes the rocker arm 21 to swing through the swiveling projection in the direction opposite to that in which the swiveling shaft 22 or the forked washer 27 has been rotated. This means that the rocker arm 21 is always rotated in the same direction in which the sun gear 31 rotates. Now assuming that the sun gear 31 is rotated in the counter-clockwise direction(or in the direction as indicated by the arrow in FIG. 2), the swiveling gear 34 is rotated in the clockwise direction (or in the direction as indicated by the arrow) while the rocker arm 21 swings about the support pivot 1d counter-clockwise. This brings the swiveling gear 34 mounted on a forward end of the rocker arm to swing into meshing engagement with a reel gear 6c that is integrally connected to the take-up reel 6 on a reel shaft 6a and rotate the take-up reel 6 in the counter-clockwise (or the arrowed direction) at fast speed. On the other hand, the sun gear 31 is rotated in the clockwise (the direction opposite to that of the arrow in the drawing), the rocker arm 21 is swung counter-clockwise bringing the swiveling gear 34 which is now rotating in the clockwise direction into engagement with a reel gear 5a that is integrally connected to the supply reel 5. Thus the supply reel rewinds the tape at a fast speed.

Figures 4, 5A, 5B, 5C, 6:
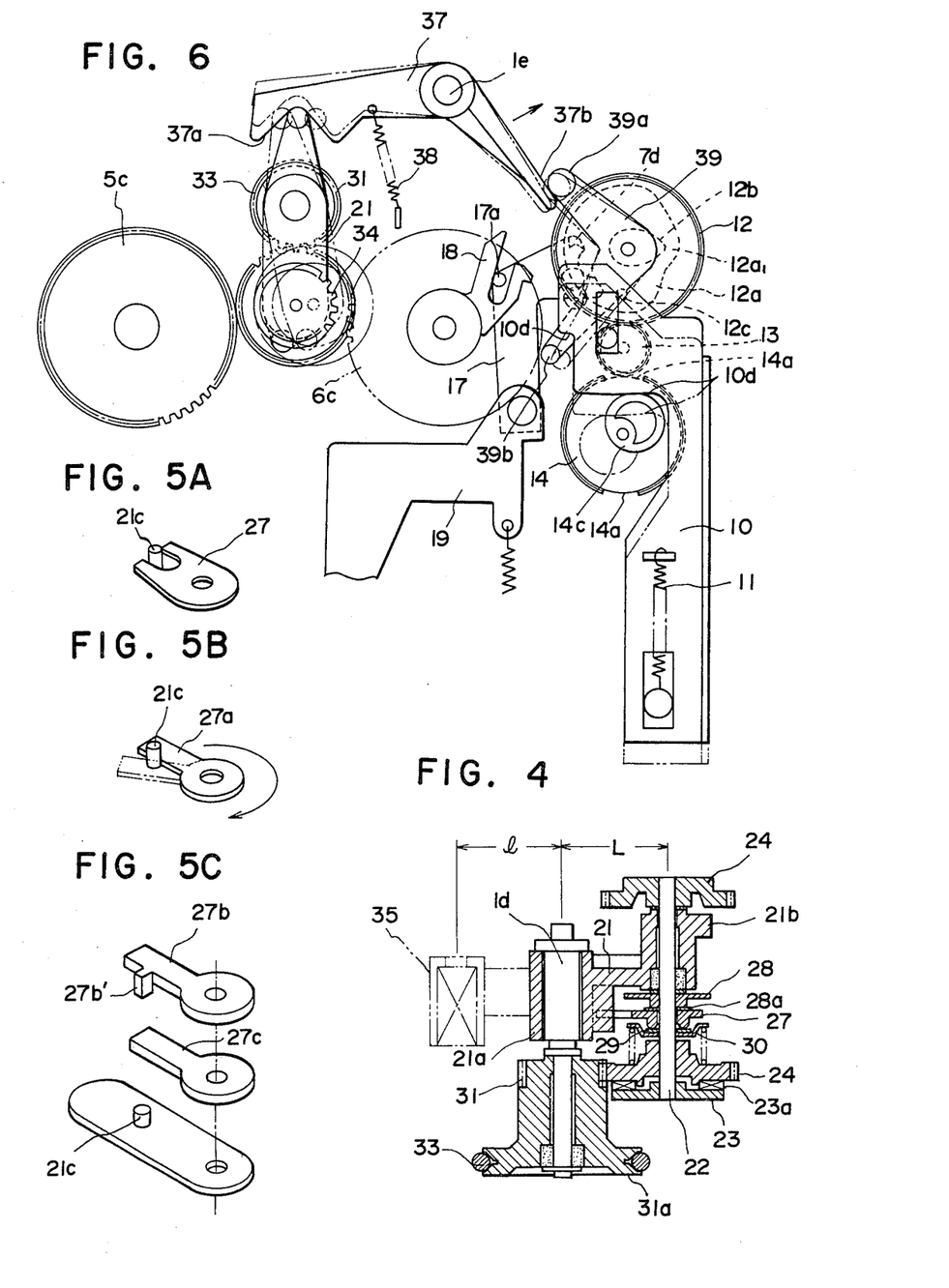
FIG. 4 is a modified form of the fast forwarding and fast rewinding mechanism.
FIGS. 5A to 5C are perspective views of various time delay systems embodied in the high-speed tape drive mechanism.
FIG. 6 is a plan view of a means operative for preventing functioning of the automatic stop mechanism of the tape player of the invention.

FIG. 4 is a second embodiment of the fast-speed tape driving mechanism constructed in accordance with the present invention. It differs from the first embodiment as illustrated in FIG. 3 in that the second embodiment eliminates the upper compression spring 25 while transferring the first bush 28 from beneath the forked washer 27 onto the upper surface of a newly interposed third bush 28a that is placed upon the first bush. Again, in this embodiment the first bush is secured to the swiveling shaft for rotation therewith. Therefore, when the first bush 28 is rotated in one direction the forked washer 27 will be swung in the same direction. In the drawing there is depicted in broken lines a balanceweight 35 connected to the fast-speed tape driving mechanism. This balanceweight is employed for the purpose of minimizing the amount of torque required to rotate the rocker arm 21. In the system the weight of the balanceweight 35 may be determined by the equation, $$GL = gl$$

wherein
G: The total weight of the swiveling shaft 22 and all the members carried on the shaft;
L: The distance between the axis of the swiveling shaft 22 and that of the support pin 1d;
l: The distance between the axis of the support pin and the vertical axis through the center of gravity of the balanceweight 35.

In either of the aforesaid first and second embodiments the forked washer 27 which engages the swiveling projection 21c of the rocker arm 21 may be configured as illustrated in FIG. 5 (A). With this configuration of the forked washer, however, it is likely to happen that the tape, when switched over immediately from fast forward to fast rewinding travel, or vice versa, would be strongly pulled taut due to the action of inertia. In fact, this jerky action may seriously damage the tape, and in extreme cases, may break it. In order to eliminate such damage, it is required to interpose a certain amount of time-gap between this direct change-over between fast forwarding and fast rewinding drive of the tape. This may be embodied by the use of a push washer 27a with a single finger as illustrated in FIG. 5(B) instead of the originally employed forked washer. In the arrangement of the rocker arm incorporating the push washer 27a, when the tape is switched directly from the fast forwarding to the fast rewinding drive (or vice versa) the push washer has to rotate through the larger arc of rotation in order to bear against and actuate the swiveling projection 21c, which affords a certain amount of time-gap whereby the tape will be prevented from being strongly pulled. In order to extend still longer this time-gap, a separate form of washer assembly may be employed as shown in FIG. 5(C), which comprises a push washer 27c adapted to engage with and rotate the swiveling projection 21c and key-shaped washer 27b with a bit 27b' adapted to engage with and rotate the push washer 27c. The operation of this assembly is such that when the tape is switched over between fast forward and fast rewinding drives, the key-shaped washer 27b has first to rotate over the larger arc of rotation in order to engage with the push washer 27c which in turn, also after having rotated through the larger arc of rotation, comes into engagement with the swiveling projection 21c for rotation. It will be easily recognized that in either of the above washer arrangements the tape is kept from being pulled undesirably when switched over directly between fast forward and fast rewinding drives. In order to attain the same effect, a similar arrangement may be incorporated betweeen the gearing system of the sun gear 31 and pulley 31a.

A restriction plate 36 is slidably disposed on the chassis adjacent to the head base 2 for forward movement (or upward in the drawing) against the action of a tension spring 36a as the play arm 20 is rotated clockwise. The restriction plate 36 is also provided with a U-shaped cutout 36b intended to engage with the forward end of the rocker arm 21 to keep the latter 21 from swinging back and forth so that the rocker arm will not come into meshing engagement either with the reel gear 5a of the feed reel 5 or with the reel gear 6c or the takeup reel 6.

Referring to FIG. 6, an actuating lever generally designated at 37 is pivotally disposed on a support pin 1e secured to the chassis 1, and normally urged to swing in a counter-clockwise direction by the action of a tension spring 38. The actuating lever 37 is formed at its one side with a V-shaped cutout 37a into which a swing pin 21d affixed on a rear end of the rocker arm 21 is engaged. An angle lever 39 is pivotably carried on the shaft of the first gear 12 and is provided at its one end with a push pin 39a which is intended to abut against a tapered arm 37b of the actuating arm 37. Furthermore, the angle lever 39 has at its other end a control pin 39b adapted to bear against one side of the automatic stopper lever 17.

With the above arrangement, when the rocker arm 21 is in the fast-forward or the fast-rewinding drive position, the actuating lever 37 is in the position depicted by chain-line with its tapered arm displaced away from the push pin of the angle lever 39. Hence, the automatic stopper lever 17 is allowed to swing freely. When the rocker arm 21 is put into the neutral position represented by solid-line where the actuating lever 37 and the angle lever 39 are both in the solid-line positions, the angle lever 39 thrusts its control pin 39b against the automatic stopper lever 17 to swing the latter outwardly. When the system is in this position the automatic stopper mechanism of the tape recorder will not operate even if the take-up reel 6 ceased rotation, this allowing the continuous rotation of the capstan.

Figure 7:
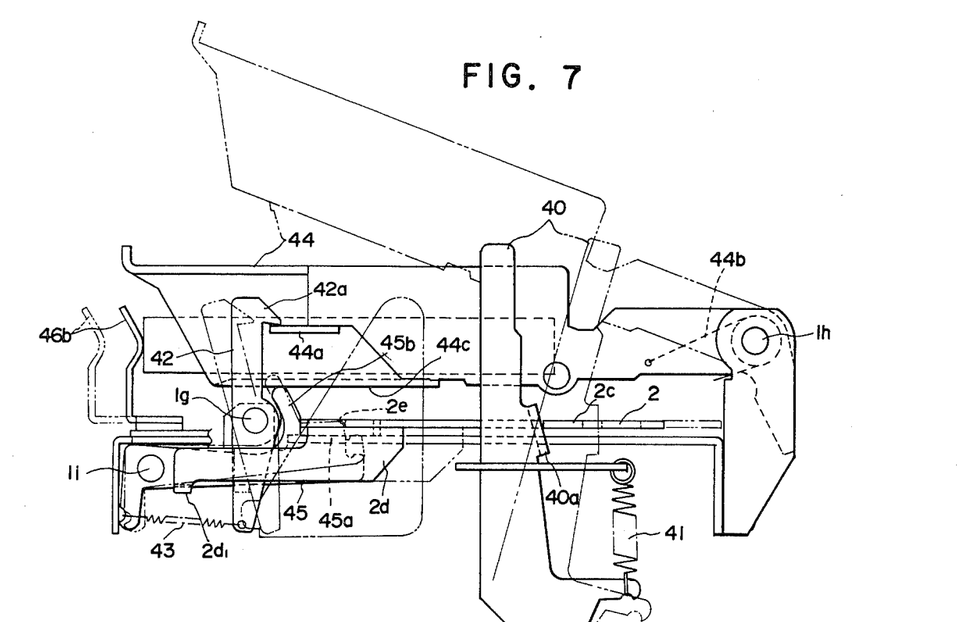
FIG. 7 is a side view of the cassette holder.

Referring now to FIG. 7, an ejecting lever 40 is rotatively disposed on a pivot pin 1f secured to the chassis 1 and is urged to rotate counter-clockwise by the action of a tension spring 41. The ejecting lever 40 is formed at an intermediate portion in its length almost vertically extending a bent portion 40a intended for abutment against a side flap 2c of the head base 2. Thus, when the ejecting lever 40 is rotated from the position depicted by solid line to the position depicted by chain line, the head base 2 slides from the non-actuating position to an ejection position where the cassette holder can be opened for ejection or loading of a cassette. An auxiliary ejecting lever indicated at 42 is rotatively carried on a pin 1g fixed to the chassis 1 and normally urged to swing clockwise by the action of a tension spring 43. The head base 2 is also formed with a release tab 2d that extends vertically from the side of the head. The rearward shift of the head base 2 from the non-actuation position to the ejection position brings a bent end 2dl of the release tab to push a lower position of the auxiliary ejecting lever 42 against the force of the tension spring 43. This rotation of the auxiliary ejecting lever 42 disengages a hooked end 42a formed at a upper end of the auxiliary ejecting lever 42 from an engaging tab 44a extending horizontally from the side of a cassette holder 44. The cassette holer 44 is rotatively mounted on a pivot pin 1h secured to the chassis 1 and normally urged to rotate clockwise by a torsion spring 44b mounted on the same pivot pin. Therefore, the release of the hooked end 42a from the engaging tab 44a effected by the rotation of the auxiliary ejecting lever 42 in a counter-clockwise direction causes the cassette holder 44 to rotate open, thus permitting loading or replacement of the cassette.

A locking plate 45 is rotatively mounted on a pivot pin 1i fixed to the chassis and normally to rotate in a counter-clockwise direction by the tension spring 43. Also, the locking plate 45 is provided with a dogleg arm 45b and a locking claw 45a both intended for engagement with a slit 2e formed in the side of the head base 2. When the cassette holder 44 is in the chain-line position the locking plate maintains the doglet arm 45b upwardly in the position depicted by chain line with the locking claw 45a engaged into the slit 2e of the head base 2, thereby keeping the head base 2 in the ejection position. When the cassette holder 44 is rotated into the solid-line position, the bottom side 44c thereof pushes on the dogleg arm 45b downward, rotating the locking plate 45 clockwise into the solid-line position. Simultaneously, the locking claw 45a is disengaged from the slit 2e of the head base 2, permitting the head base 2 to advance. In doing so that head base 2 brings the slit 2e to engage with the dogleg arm 45b. As a result the head base is maintained in the non-actuation position.

Figure 8:
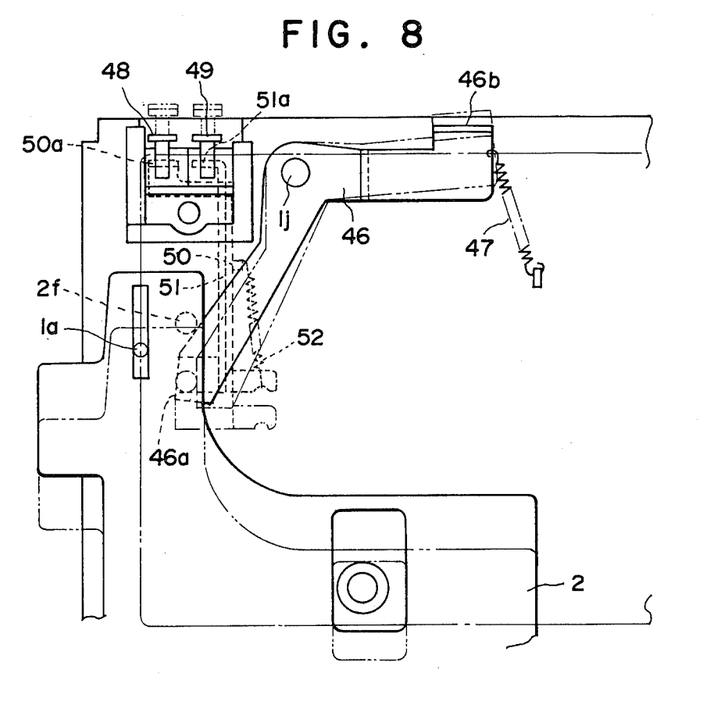
FIG. 8 is a plan view showing the operative relationship of the head base with the cassette fixer and the erase prevention means.

Referring to FIG. 8, a cassette fixing lever 46 is rotatively mounted on a pin 1j secured to the chassis 1 and normally urged to rotate in a clockwise direction by a tension spring 47. The cassette fixing lever 46 terminates at one end in a cam surface 46a intended to bear against an actuation pin 2f provided in the underside of the head base 2 when the head base 2 is in the ejection position depicted by chain line. At this moment a fixer plate 46b that is integrally formed on the cassette fixing lever at its opposite end, is moved away from the rear end of the cassette, or in the ejection position depicted by chain line as best illustrated in FIG. 7. When the base 2 is moved to the non-actuation position depicted by solid line, the cam surface 46a is displaced away from the actuating pin 2f of the head base, which in turn causes the cassette fixing lever 46 to rotate into the solid-line position by the action of the tension spring 47 thus thrusting the fixer plate 46b against the rear end of the cassette holder that is now in the closed position.

Figure 9:
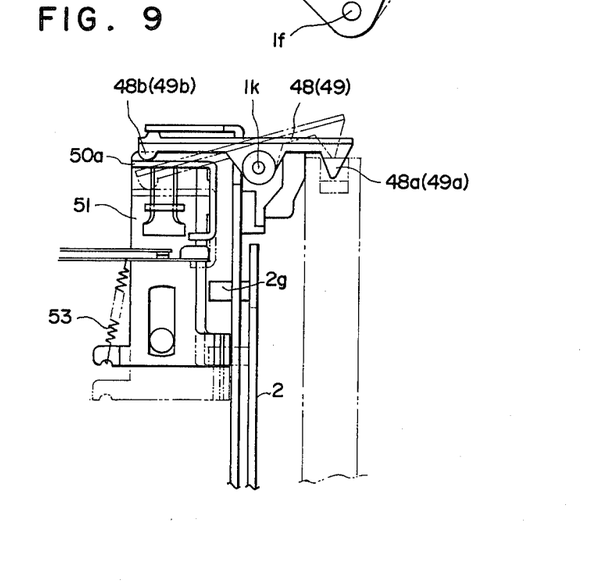
FIG. 9 is a side view of the operative relationship.

With the reference to FIGS. 8 and 9, an erasure prevention lever 48 and a chrome tape detection lever 49 are individually rotatively fulcrumed on a common shaft 1k horizontally mounted on the chassis 1. The erasure prevention lever 48 has at its one end an erasure preventive means 48a while the chrome tape detection lever 49 has at its one end a chrome tape detection means 49a. Slide plates 50 and 51 are slidably disposed and normally urged upward by tension spring 52 and 53, respectively. The slide plates are both engaged with a vertical pin 2g that extends downward from the underside of the head base 2 in the same manner as the actuation pin 2f. The slide 50 terminates at its upper end in a contact face 50a intended to bear against a control projection 48b formed on the opposite end of the erasure prevention lever 48. Also, the slide 51 has at its upper end a contact face 51a to abut against a control projection 49b formed in the opposite end of the chrome tape detection lever 49.

Thus, when the head base 2 is in the ejection position depicted by chain line, its vertical pin 2g acts to lower both slides 50 and 51 against the action of the tension springs 52 and 53, respectively. At this moment, the slides 50 and 51 keep their respective contact faces 50a and 51a spaced apart sufficiently far from the corresponding control projections 48b and 49b, respectively, of the levers. It should be borne in mind that each of the levers 48 and 49 is designed so that when any external forces are not applied, each lever is not in equilibrium and is normally inclined downward on the side of the control projection 48b or 49b due to the weight difference. Therefore, the levers 48 and 49 are now at this moment swung into the chain-line positions, respectively. When the head base 2 is shifted into the nonactuation position depicted by solid line, the slide plates 50 and 51 are also moved upward by the action of the tension springs 52 and 53, respectively, thus pushing on the projections 48b and 49b of the levers 48 and 49.

It is to be noted that the cassette tape recorder of this invention utilizes switches of the feather-touch type for operation of playback, recording, fast forward drive, fast rewinding drive, and stop of the tape. Actuation of each switch closes a corresponding circuit to power the first motor 8 or second motor 32, or solenoid 18. Ejection of the cassette holder is only mechanically actuated by operation of the ejecting lever 40.

Although the system of the cassette tape recorder of this preferred embodiment should by now be apparent, the operation of the system will now be briefly summarized for the sake of clarity.

Cassette loading operation:

Referring to FIG. 7, the cassette is loaded into the cassette holder 44 when the latter is in the chain-line position. Then, as the cassette holder 44 is closed into the solid-line position the bottom side 44c of the cassette holder 44 pushes on the dogleg arm 45b of the locking plate 45 thereby lowering the locking plate 45 into the position depicted by chain line. This descent of the locking plate 45 releases the locking claw 45a of the locking arm 45 from the side slit 2e of the head base 2, thereby allowing the head base 2 to move to the left (or forward according to FIG. 1), until an actuating pin 2f extending downward from the bottom side of the head base bears against a stop tab 20b attached to the actuating lever 20 at its rear end. Now, as shown in FIG. 8, the head base 2 is moved into the solid-line position from the ejection position depicted by chain line where the erase and recording (and reproducing) heads 2a and 2b, respectively, are in contact with the tape face of the cassette in the cassette holder. In addition, as the head base 2 advances, the cassette fixing lever 46 rotates its cassette fixing plate 46b until the latter bears elastically against the rear side of the cassette thereby holding the cassette in position. The forward movement of the head base 2 causes both slide plates 50 and 51 to slide so that their respective contacting faces 50a and 51a push elastically on the control projections 48b and 49b of the levers 48 and 49, respectively, thereby rotating the levers 48 and 49 into the operative position. However in the cassette holder the cassette has its erasure prevention flap or chrome tape indication claw kept intact in its rear side, the flap (or claw) prevents the erasure preventive means 48a of the lever 48 (or the chrome tape detection means 49a of the lever 49) from entering inside the cassette. Whereas the flap (or the claw) is removed, the slot thus formed allows the erasure preventive means (or the chrome detection means) entering inside the cassette. Therefore, it is preferable that the position of the levers 48 and 49 determined by the acceptance or rejection of the cassette by means of the erasure prevention flap and the chrome tape indication claw be electrically transmitted to a switching system which in turn produces an electrical signal to put into operation the necessary mechanism in accordance with the type of the cassette.

Furthermore, referring to FIG. 1, when the head base 2 moves forward the engaging flap 3c of the pinch roller holder 3 is disengaged from the head base, thereby allowing the pinch roller holder 3 to rotate clockwise as urged by the torsion spring 3b. This rotation of the pinch roller holder 3 is arrested when the actuating arm 3d of the pinch roller holder comes into abutment against the stop 10a of the setting plate 10. At this stage, the pinch roller 3a is not yet in contact with the capstan 4a.

Playback operation:

When the playback switch is turned on, the first motor 8 is energized to rotate the flywheel 4 and the reel pulley 7b of the reel actuating unit 7 by means of the drive belt 9. At the same time the solenoid 16 is energized to attract magnetically the shorter finger of the locking arm 15 thereby rotating the latter in the clockwise direction. This swing motion of the locking arm release its longer finger from the teeth 14b thereby allowing the latter to rotate. By this rotation of the cam wheel the setting plate 10 is retracted by the action of its tension spring with its arcuate cutout in contact with the smaller diametrical periphery of the cam wheel, thereby causing the cam plate 14c to be rotated a certain amount. The rotational movement of the cam plate puts the third gear wheel 14 into meshing engagement with the second gear wheel 13. Since the second gear wheel 13 is driven by the flywheel 4 by means of the drive belt (not shown) as mentioned earlier, the third gear wheel 14 now in meshing with the second gear wheel is rotated through an angle of approximately 180°. This turn of the third gear wheel 14 brings the cam plate 14c to rotate further and thrust its larger diametrical periphery against the circumference of the roller 20a of the play arm 20, which in turn swings the play arm in the clockwise direction thereby causing the head base 2 to further advance into the actuation position.

With the head base in the actuation position the setting plate 10 which is at its arcuate cutout 10c in contact with the smaller diametrical periphery of the cam plate 14c is forced into the retracted position by the action of the tension spring 11. Hence, the stop 10a of the setting plate is displaced rearward far enough from the actuating arm 3d of the pinch roller holder 3 so that the pinch roller holder 3 is swung clockwise to press the pinch roller 3a against the capstan 4a.

Furthermore, as the setting plate 10 is moved backward, the forward edge 10b of the setting plate 10 is displaced away from the arresting projection 7d of the reel actuating unit 7, thereby allowing the latter to swing clockwise by the action of the tension spring 7e. This rotation of the reel actuating unit brings the reel pulley 7b to contact with the rubber roller of the take-up reel 6 thereby driving the take-up reel 6 for playback of the tape.

It is to be recognized that with the tape recorder in the actuation position the clockwise rotation of the play arm 20 puts the restriction plate 36 into the advanced restricted position with a forward end portion of the rocker arm 21 entrapped within the U-shaped cutout 36a thereby keeping the rocker arm 21 from swinging sideways. This prevents the swiveling gear wheel 24 from meshing either with the reel gear 5a of the feed reel 5 or the reel gear 6c of the take-up reel 6.

Because operation of the recording function of the tape recorder of this invention is in principle effected in the same manner as the playback operation, its description is omitted in this specification for the sake of simplicity.

Transfer from the playback to the non-actuation position:

When the stop switch is actuated, the solenoid 16 is energized to swivel the locking arm 15 instantaneously counter-clockwise, thereby disengaging from the ratchet tooth 14b which in turn rotates the cam plate 14c a certain amount. This brings the third gear wheel 14 to mesh with the second gear wheel 13 which in turn while rotating drives the third gear wheel 14 through an angle of approximately 180°. By this turn of the third gear wheel, the play arm 20 drops back into the original position, thereby retracting the head base 2 into the intermediate position. Further, the rotation of the cam plate on the third gear wheel causes the setting plate 10 to move forward against the force of the tension spring 11, thrusting its forward end portion 10b against the arresting projection 7d. The arresting projection is then swung in the counter-clockwise direction against the force of the tension spring 7e, thereby displacing the reel pulley 7b away from the rubber roller of the take-up reel 6. Thus, the take-up reel 6 ceases rotation. Also, at the same time since the setting plate 20 moves into the advanced position, the stop 10a thereof forces the actuating arm 3d of the pinch roller holder 3 to swing in the counter-clockwise direction so that the pinch roller 3a of the pinch roller holder 3 is moved away from the capstan 4a.

Fast forwarding drive of the tape:

When the fast drive switch is turned on, the first and the second motor 8 and 32, respectively, are both powered. The second motor drives the sun gear pulley 31a in the counter-clockwise direction, or arrowed direction in FIG. 2, through the drive belt 33. The rotation of the sun gear pulley 31a rotatess the sun gear 31 made integral therewith which in turn drives the planet gear 24, but in the clockwise direction. Since the felt linings 23a are frictionally interposed between the planetary gear and the disc 23, the rotational movement of the planetary gear is transmitted through said disc to the swiveling shaft 22 and then to the swivelling gear wheel 34, which are to rotate in the clockwise direction (or the arrowed direction). The rotation of the swiveling shaft 22 rotates the first bush 28 also in the same direction which causes the forked washer 27 disposed in frictional contact with the first bush to swivel with the swiveling projection 21c of the rocker arm 21 engaged within its fork in the same direction of rotation of the swiveling shaft 22. Hence, the rocker arm 21 is flung about the support pin 1d of the counterclockwise direction thereby bringing the swiveling gear wheel 34 into meshing engagement with the gear 6c of the take-up wheel 6. The rotation of the swiveling gear wheel is now transmitted to the take-up reel 6 to drive the latter at high speed.

Fast rewinding of the tape:

When the fast rewinding switch is actuated, the second motor 32 is revolved in the direction opposite to that with the fast forward drive of the tape. Therefore, the sun gear pulley 31a, the sun gear 31, the planet gear 24, the swiveling shaft 22, and the swiveling gear wheel 24 are all rotated correspondingly in the directions opposite to that in which they are rotated in the fast forward drive. In this case, with respect to FIG. 2, the rocker arm 21 is swung clockwise by means of the forked washer 27 thereby throwing the swiveling gear wheel 24 into meshing engagement with the gear 5a of the feed reel 5. The highspeed rotation of the swiveling gear wheel is now transmitted to the feed reel 5 to rotate the latter in the clockwise direction thereby rewinding the tape at a high speed.

The function of the automatic stop mechanism in the playback operation:

When the take-up reel 6 is driven in the playback position the scissorlike arm 18 is biased in the clockwise direction (or the arrowed direction). Therefore, the automatic stop lever 17 is also biased in the same direction with its control projection 17b maintained in sliding contact along the rim of the eccentric cavity 12a of the first gear wheel 12. At this time the flywheel 4 drives the first gear wheel 12 through the second gear wheel 13 by means of the drive belt since the second and the first gear wheels 12 and 13, respectively, intermesh. In this case, as long as the first gear wheel 12 continues to rotate with the control projection 17b kept to slide along the rim of the eccentric cavity in the underside of the first gear wheel, the control projection 17b keeps to stay away from the orbit along which the engaging projection 12c travels thereby preventing engagement of the engagement projection with the control projection.

When the take-up reel 6 winds up the tape fully and therefore comes to stop rotating, the scissorlike arm is released from the biasing force exerted by the clockwise rotation of the take-up reel so that the control projection 17b is set free within the eccentric cavity of the first gear wheel 12. As the first gear wheel 12 still continues to rotate, the control projection 17b is forced to pass through the narrowest spaced path 12a1 so that the control projection 17b is kept in the particular position where the engaging projection 12c while rotating is to intersect and engage the control projection. The engagement of the engaging projection with the control projection brings the automatic stop lever 17 to move forward (or upward in the drawing) thereby pulling the stop lever 19. This forward movement of the stop lever 19 actuates the stop switch to de-energize the first motor 8 while allowing the headbase 2 to recede into the non-actuation position.

The function of the automatic stop mechanism in the fast forwarding drive of the tape:

With the tape recorder in the fast forwarding drive position, the take-up reel 6 is driven in the same manner in the actuation position except that it is rotated at higher speed. The control projection 17b is similarly pressed against the rim of the eccentric cavity 12 of the first gear wheel 12. When the take-up reel 6 ceases its rotation, the control projection 17b will be engaged with the engaging projection 12c in the same manner as explained in the immediately proceeding paragraph. Subsequently, the automatic stop lever 17 is forced forward thereby pulling the stop lever 19 so as to actuate the stop switch.

The function of the automatic stop mechanism in the fast rewinding drive of the tape:

When the tape recorder is in the fast rewinding drive position the take-up reel 6 is driven in the clockwise direction opposite to that in which it is rotated for playback. Therefore, the scissorslike arm 18 is biased in the clockwise direction, keeping the automatic stopper lever 17 biased also in the same direction. Therefore, the control projection 17b is now pressed against the external circumference of the cam 12b within the eccentric cavity 12a in the first gear wheel 12. As long as the take-up reel 6 is driven the first gear wheel 12 turns with the control projection 17b kept to slide along the outer periphery of the cam 12b. When the feed reel winds up the tape fully and the take-up reel 6 stops rotation, the control projection 17b will be displaced away from the cam and forced to pass through the narrowest spaced path 12a1 so that it will eventually be engaged with the engaging projection 12c. The final portion of rotation of the first wheel 12 brings the engaging projection 12c to engage with the control projection thereby causing the automatic stopper lever 17 to move forward. This movement of the automatic stopper lever pulls at the stopper lever 19 to actuate the stop switch.

The pause mechanism in the actuation operation:

When the head base 2 is in the actuation position, as mentioned earlier, the take-up reel 6 is driven at normal speed. As the pause switch is actuated, the setting plate 10 is further moved forward and locked to the position illustrated in FIG. 2 while retracting its forward edge 10b, so that the reel actuating lever 7a will be swung counterclockwise. This rotation of the reel actuating lever displaces the reel pulley 7b away from the rubber roller of the take-up reel 6 so that the take-up reel 6 is allowed to stop its rotation. Also, by the forward movement of the setting plate 10 the pinch roller holder 3 rotates counter-clockwise to displace the pinch roller 3a away from the capstan 4b so as to stop the tape running.

In this case, the restriction plate 36 is advanced in the same manner as described with respect to the actuation operation, and its U-shaped cutout 36a engages the forward end portion of the rocker arm 21, thereby keeping the rocker arm 21 from engagement with either of the gears from the feed or take-up reel. Referring to FIG. 6, the rocker arm 21 is also engaged at its rear end with the V-shaped cutout 37a of the actuating lever 37 thereby keeping the actuating lever 37 in the position depicted by solid line. Therefore, when the control lever 39 is rotated in the clockwise direction into the solid-line position, the control pin 39b comes into abutment against the side of the automatic stopper lever 17 thereby thrusting its control projection 7d against the rim of the eccentric cavity 12a. Therefore, as long as the control projection is maintained in this position where it will not engage with the engaging projection 12c, functioning the automatic stop mechanism is prevented.

Figure 10:
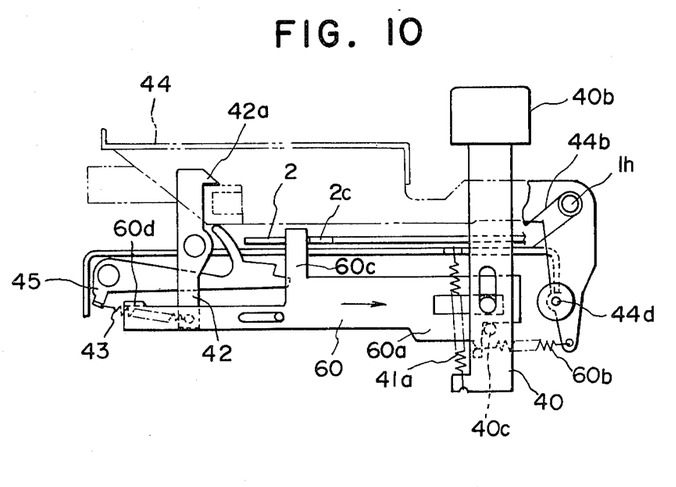
FIG. 10 is a side view of a cassette ejecting system of an alternative embodiment of this invention.

FIG. 10 represents schematically another embodiment of the cassette ejection system constructed in accordance with the present invention, which differs basically from the previous embodiment as illustrated in FIG. 7 in that the ejecting lever 40 which is normally urged upward by the action of a tension spring 61 is made vertically slidable. A slider 60 is formed at its rear bottom side with a cam surface 60a and normally held in position by the force of a tension spring 60b which pushes the slider into engagement with a locking pin 40c fixedly planted on the ejecting lever 40.

Figure 11:
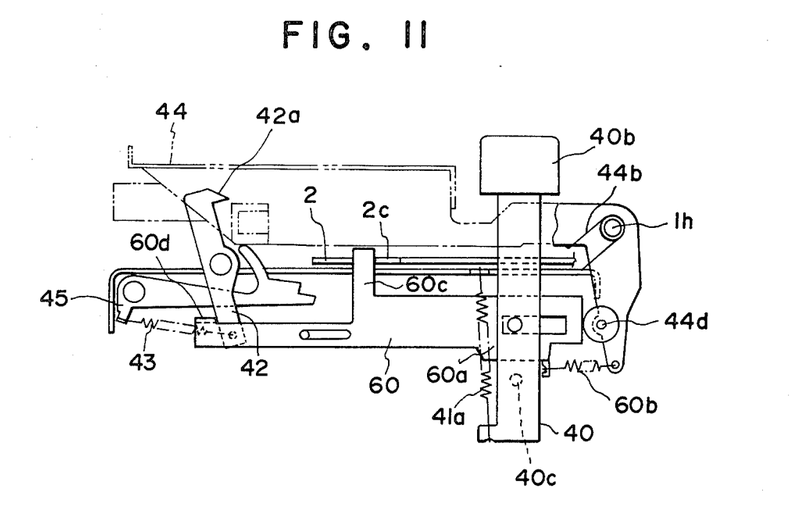
FIG. 11 and FIG. 12 are side views representing the actuating position of the cassette ejecting system.

With the above arrangement, when the ejection button 40b attached to the top portion of the ejecting lever 40 is depressed the lever 40 is lowered against the action of the tension spring 41a to disengage the cam surface 60a on the slider 60 from the locking pin 40c, thus allowing the slider to slide longitudinally in the arrowed direction as pulled by the tension spring 60b. The slider 60 is also formed with an actuating projection 60c that extends upward from the middle portion thereof. Therefore, the sliding movement of the slider 60 brings the actuating projection into engagement with the slide flap 2c on the head base 2 thereby carrying the head base 2 to the right into the ejection position. Furthermore, a releasing anchor 60d is provided on a rear of the slider 60 and intended to rotate the auxiliary ejecting lever 40 counterclockwise according as the slider 60 moves to the right. This rotation of the auxiliary ejecting lever causes the locking claw 42a to disengage with the engaging flap 44a on the cassette holder 44 (as best illustrated in FIG. 11).

Figure 12:
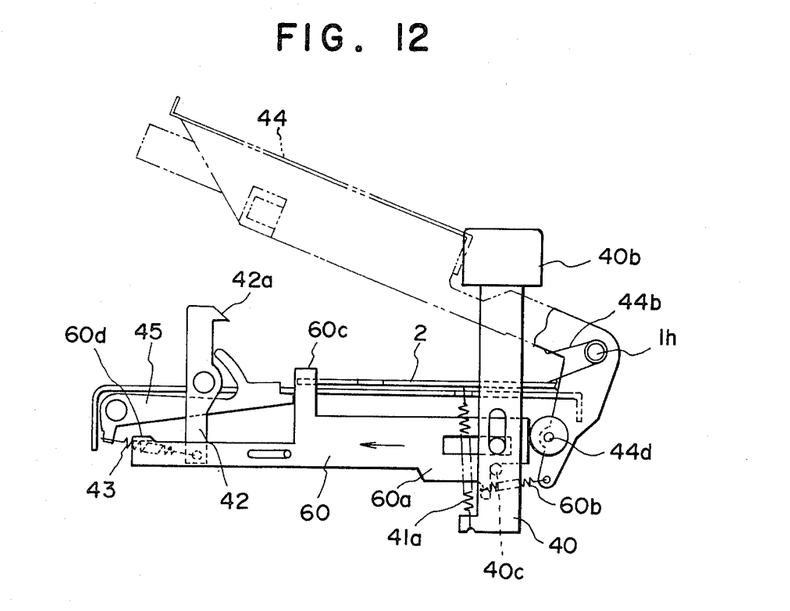

This engagement of the locking claw 42a from the engaging tab 44a allows the cassette holder 44 to rotate, by the action of the torsion spring 44b, into the illustrated position in FIG. 12. Simultaneously, the roller 44d rotatively mounted on the lower position of the cassette holder 44 comes into abutment against a rear end face of the slider 60 and pushes the latter 60 toward the left until the cam surface 60a is engaged with the locking pin 40c of the ejecting lever 40, thus holding the slider in its initial position.

It should be noted that, when the tape recorder is in the actuation position, the rocker arm 21 is likewise maintained in the neutral position and pressing the actuating lever 37 in an attempt to rotate the latter into the position depicted by solid line. However, the setting plate 10 is maintained in the chain-line position with its stepped portion 10c of the setting plate 10 engaged with the control pin 39b of the angle lever 39, the automatic stopper lever 17 is set in such a position that the automatic stop mechanism can be put into operation at any required time.

As described above, the tape recorder of the present invention comprises a first motor intended for driving the capstan and the take-up reel for recording and reproduction and a second motor adapted only for fast forwarding and fast rewinding of the tape. Therefore, for recording or reproduction only the first motor is driven, the tape recorder works on a relatively small amount of electricity, and is hence economical. Furthermore, since when the second motor is driven for fast forwarding or fast rewinding of the tape but not for recording or reproduction, the tape recorder permits as the second motor the use of an inexpensive motor, which may not be very precise in performance or even have more or less of a noise problem.

As also stated above, the reel drive system of the present invention utilizes a friction member, for example, a forked washer which is frictionally pressed on or around the driven shaft journaled in a forward end portion of the rocker arm with an opposite end of the rocker arm held between the forked end of the forked washer. With the above arrangement, when the forward end of the rocker arm carries the driven shaft in either way so as to bring the swiveling gear into mesh with the reel, the amount of frictional force to be developed between the forked washer and the driven shaft can be relatively small. And yet the amount of rotational moment at the driven shaft can be large enough to insure the rocker arm to swing swiftly with a precise motion and to hold it effectively in mesh with the reel in order to drive the tape at fast speed. Additional advantages of the present invention are that this arrangement not only permits the use of a motor which cannot develop but a small torque for driving the reels at high speed, but also enables the frictional pads or linings for the forked washer to work effectively for relatively extended periods.

As stated above, the cassette ejecting systems of this invention can be mechanically operated to open the cassette holder for removal of a cassette therefrom. Hence, in the case of the power stoppage during recording or reproduction where the recording or reproducing head and the capstan are rendered immobile with the tape kept in the operative position, operation of the ejecting lever will displace the head and capstan to the non-operative position so that the cassette holder can be opened not by means of the electrically controlled ejection button but mechanically. On the other hand, the remaining control buttons for the recording, reproduction and tape drive purposes are of the feather-touch type. It will also be recognized that the tape recorder of this invention is lightweight and compact in size.

What is claimed is:

1. A tape player for recording and reproducing sound comprising
   a feed reel and a take-up reel
   a capstan;
   a first motor adapted to provide a first driving force;
   first gearing means for transmitting said first driving force both to said take-up reel and said capstan;
   a second motor adapted to provide a second driving force;
   second gearing means for transmitting said second driving force selectively to one of the take-up reel and feed reel at high speed for fast forwarding or fast rewinding of the tape.

2. A tape player according to claim 1, wherein said first gearing means includes a first motor pulley connected coaxially to said first motor; swingable pulley means; a flywheel connected coaxially with the capstan; a first drive belt passed around the first motor pulley, the swingable pulley means, and the flywheel; and means for actuating said swingable pulley into and out of engagement with the take-up reel.

3. A tape player according to claim 2, wherein said swingable pulley means includes a swingable pulley, a swiveling lever diametrically extending relative to said swingable pulley and having a first end, a middle portion, and a second end; said middle portion coaxially secured to said swingable pulley, said swiveling lever being adapted for pivotal movement about said first end.

4. A tape player according to claim 3, wherein said actuating means includes a setting plate slidable with respect to the chassis, said swiveling lever being urged toward the take-up reel, said setting plate being in contact with the swiveling arm at said second end thereof, said setting plate being slidable in two opposite directions to give way to said urge of the swiveling lever and to counteract the same.

5. A tape player according to claim 4, wherein said actuating means further includes locking means for locking said rocker arm.

6. A tape player according to claim 5, wherein said locking means includes a cam plate actuated by said plate, a play arm swingably mounted on the chassis to follow said cam plate at a first arm end thereof, a restriction plate actuated by said play arm to lock said rocker arm whereby the planet gear is retained out of engagement with the feed reel and the take-up reel.

7. A tape player according to claim 1, wherein said second gearing means includes a second motor pulley connected coaxially to said second motor, a sun gear, a second drive belt passed around said second motor pulley and said sun gear, a planet gear in mesh with said sun gear, and a rocker arm adapted to swing said planet gear between said feed reel and said take-up reel for engagement.

8. A tape player according to claim 7, wherein said locker arm is adapted to be locked to retain the planet gear out of engagement with the feed reel and the take-up reel.

* * * * *